US008788413B2

(12) United States Patent
Rabson et al.

(10) Patent No.: US 8,788,413 B2
(45) Date of Patent: Jul. 22, 2014

(54) SYSTEM AND METHOD FOR MANAGING RELATED ACCOUNTS

(75) Inventors: Jeremy Keith Rabson, Newton, MA (US); Scott David Grimes, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 0 days.

(21) Appl. No.: 12/248,736

(22) Filed: Oct. 9, 2008

(65) Prior Publication Data

US 2009/0048931 A1   Feb. 19, 2009

Related U.S. Application Data

(63) Continuation of application No. 11/123,693, filed on May 5, 2005, now abandoned.

(51) Int. Cl.
*G06Q 40/02* (2012.01)

(52) U.S. Cl.
USPC ............ 705/40; 235/379; 705/14.32; 705/30; 705/35; 705/38; 705/39; 705/44; 705/66

(58) Field of Classification Search
USPC ...................................................... 705/35–45
See application file for complete search history.

(56) References Cited

U.S. PATENT DOCUMENTS

| 4,194,242 | A | | 3/1980 | Robbins | |
|---|---|---|---|---|---|
| 5,950,179 | A | | 9/1999 | Buchanan et al. | |
| 6,009,415 | A | * | 12/1999 | Shurling et al. | 705/35 |
| 6,038,552 | A | * | 3/2000 | Fleischl et al. | 705/44 |
| 6,158,657 | A | | 12/2000 | Hall, III et al. | |
| 6,354,490 | B1 | * | 3/2002 | Weiss et al. | 235/379 |
| 6,374,230 | B1 | * | 4/2002 | Walker et al. | 705/35 |
| 6,374,231 | B1 | | 4/2002 | Bent et al. | |
| 2001/0037243 | A1 | * | 11/2001 | Rouston et al. | 705/14 |
| 2001/0047342 | A1 | * | 11/2001 | Cuervo | 705/66 |
| 2002/0023051 | A1 | | 2/2002 | Kunzle et al. | |
| 2002/0116324 | A1 | | 8/2002 | Macias | |
| 2002/0188533 | A1 | * | 12/2002 | Sanchez et al. | 705/30 |
| 2002/0194094 | A1 | * | 12/2002 | Lancaster et al. | 705/35 |
| 2002/0198803 | A1 | | 12/2002 | Rowe | |
| 2003/0208438 | A1 | * | 11/2003 | Rothman | 705/38 |
| 2004/0039694 | A1 | * | 2/2004 | Dunn et al. | 705/39 |
| 2004/0111363 | A1 | | 6/2004 | Trench et al. | |
| 2004/0143527 | A1 | * | 7/2004 | Benkert et al. | 705/35 |
| 2006/0184438 | A1 | * | 8/2006 | McDow | 705/35 |
| 2006/0190399 | A1 | * | 8/2006 | Silverman | 705/40 |

FOREIGN PATENT DOCUMENTS

WO          96/22576     *   7/1996  ............. G06Q 40/00

OTHER PUBLICATIONS

Schedule of Fees and Funds Availability, First Union, 2 pages, Jul. 7, 2000.
"Moving into the future with you . . . our members," 4 pages, Jan. 24, 2005, http://www.nsffcu.org/mainpage.jsp?PageName=VISA Disclose.
"Business Fee Schedule," 3 pages, Jan. 24, 2005 http://www.secu.org/ratesfees/businessfeesschdule.htm.
"Western Federal Credit Union: RATES," 4 pages, Jan. 24, 2005 http://www.western.org/infodesk/currentRates.htm.

* cited by examiner

*Primary Examiner* — Robert Niquette
(74) *Attorney, Agent, or Firm* — Hunton & Williams LLP

(57) ABSTRACT

The present application relates to a system and method for managing a plurality of accounts. A plurality of accounts is provided, with each account being associated with a customer. Account activity information associated with at least one action regarding one of the plurality of accounts is received at a first predetermined frequency. The received account activity information is analyzed, and at least one term of another account amongst the plurality of accounts is modified based upon a result of the analysis at a second predetermined frequency.

27 Claims, 2 Drawing Sheets

SYSTEM AND METHOD FOR MANAGING RELATED ACCOUNTS

FIELD

The present application relates to management of accounts, and more particularly to a system and method for managing terms associated with related accounts.

BACKGROUND

Recent innovation has led to a variety of products and associated account types becoming available to customers. Consequently, a customer having a plurality of accounts each corresponding to different products or services has become common.

Conventionally, each of the plurality of accounts is distinct, and each may have independent and unrelated terms and conditions associated with their use. For example, a customer may have a plurality of independent financial accounts, including a credit account, a savings account, a home equity line of credit account, a mortgage account, and the like, and each account may have an independent set of terms regulating its use and operation.

Conventionally, even though each of the plurality of accounts may be associated with a common customer, information regarding transaction activity in one account is not utilized to adjust terms and conditions in another account. This independence of terms results in a loss of benefit to the customer, as well as in an inability of an institution managing the accounts to change account terms to adjust for varying activity and risk level.

Therefore, a need exists for a system and method for managing terms of a plurality of related accounts whereby account activity of one or more accounts may be used to modify terms of other related accounts.

SUMMARY

An aspect of the present application provides for a method for managing a plurality of accounts, comprising providing a plurality of accounts each associated with a customer, receiving account activity information associated with at least one action regarding a first account at a first predetermined frequency, analyzing the received account activity information and modifying at least one term of a second account based upon a result of the analysis at a second predetermined frequency.

A further aspect of the present application provides for a system for managing a plurality of accounts, comprising a plurality of accounts each associated with a customer, and an account management system, wherein the account management system: receives account activity information associated with at least one action a first account at a first predetermined frequency, analyzes the received account activity information, and modifies at least one term of a second account based upon a result of the analysis at a second predetermined frequency.

DETAILED DESCRIPTION

The exemplary embodiments of the present application relate to a system and method for managing related accounts. The accounts may be, for instance, financial accounts. The system and method may include monitoring account activity information, analyzing the activity information, and adjusting terms of one or more of the plurality of accounts based upon results of the analysis.

Figure 1:
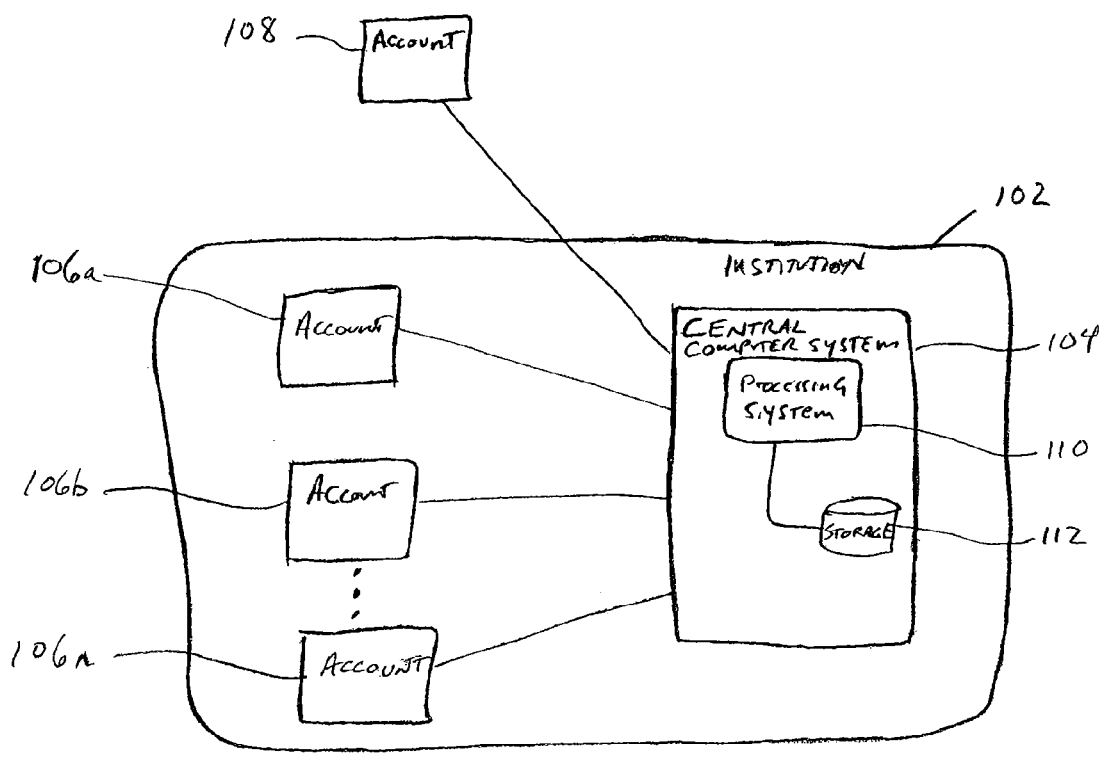
FIG. 1 shows an exemplary account management system according to the exemplary embodiments of the present application.

Referring to FIG. 1, an exemplary account management system 100 of the present application may include an institution 102, which may provide various services including establishment, maintenance, and management of accounts. The institution 102 may provide services to customers through one or more transaction accounts 106a-106n. Each of the accounts 106a-106n may be associated with an account holder, which is typically an identified principal holder of the account. There may be, however, one or more other entities associated with transaction accounts 106a-106n, including individual and enterprise entities. Additionally, the account management system 100 may include one or more external accounts 108 that are established and maintained by a distinct and separate institution.

The institution 102 may include an account management central computer system 104. The central computer system 104 may include at least a processing system 110 and a storage system 112. As will be appreciated by one skilled in the art, however, the exemplary system of the present application is not limited to the elements described and illustrated in the present application.

An exemplary account management system of the present application may include software programs or routines stored in and executed by the central computer system 104, and each software program or routine may be capable of performing communication with other computer systems in conjunction with conventional computer communication hardware and software. Communication between the computer systems utilized in the present application may be performed via a public communication network, for example the Internet, or may be performed via a private communication network separate from and independent of a public communication network.

As will be appreciated by one skilled in the art, the terms "computer system" and "network" as used herein may include a variety of combinations of fixed and/or portable computer hardware, software, peripherals, and storage devices. Additionally, each computer system of the present application may include a plurality of individual components that are networked or otherwise linked to perform collaboratively, or may include a single stand-alone component.

Generally, each computer system of the present application may include at least a processor, a random-access memory, a local and/or a remote storage device, and peripherals such as keyboards, mice, and monitors for enabling input and output of information to and from a computer system. Software routines and/or programs may be embedded and/or stored in the storage devices and run by the processors. Each network identified herein may include wired or wireless communication lines and associated hardware devices used in transmitting, receiving, and routing data, such as routers, switches, hubs, interfaces, and the like.

The hardware and software components of the computer systems of the present application may include and may be included within fixed and portable devices including desktop, laptop, server, personal digital assistant, smart phone, clock, television, radio, and audio and video devices.

Communication between the computer systems of the present application may be performed using wired or wireless communication lines, and may be performed using any suitable analog or digital communication protocol including TCP/IP, GSM, GPRS, EDGE, WAP, 3G/UMTS, CDMA, TDMA, and the like.

FIG. 1 illustrates a system for managing accounts according to an exemplary embodiment of the present application. Steps of an exemplary method of the present application are described in detail below with reference to FIG. 2.

Each of the plurality of related accounts may be established and maintained by institution 102. The plurality of related accounts may be associated with the same, similar, or dissimilar types of products. In an exemplary embodiment, the plurality of related accounts may include, for example, savings accounts, checking accounts, credit accounts, debit accounts, mortgage accounts, home equity line of credit accounts, brokerage accounts, foreign currency accounts, incentive reward point accounts, and the like. Alternatively, the plurality of related accounts may include, for example, security access accounts, medical accounts, transportation accounts, and academic accounts.

The plural accounts may be related to one another by correlating account identification numbers, account identification names, or other identifying indicia of each account with an identification number or name of an account holder. The correlation, for example, may be performed by associating the account identifying indicia with the account holder using data stored in at least one database or other data structure stored in the storage unit 112 of the central computer system 104 of the institution 102. The association may be stored in at least one remote or local database or storage device. Association and storage of identifying information utilizing databases are well-known in the art, and therefore will not be described in detail herein.

Figure 2:
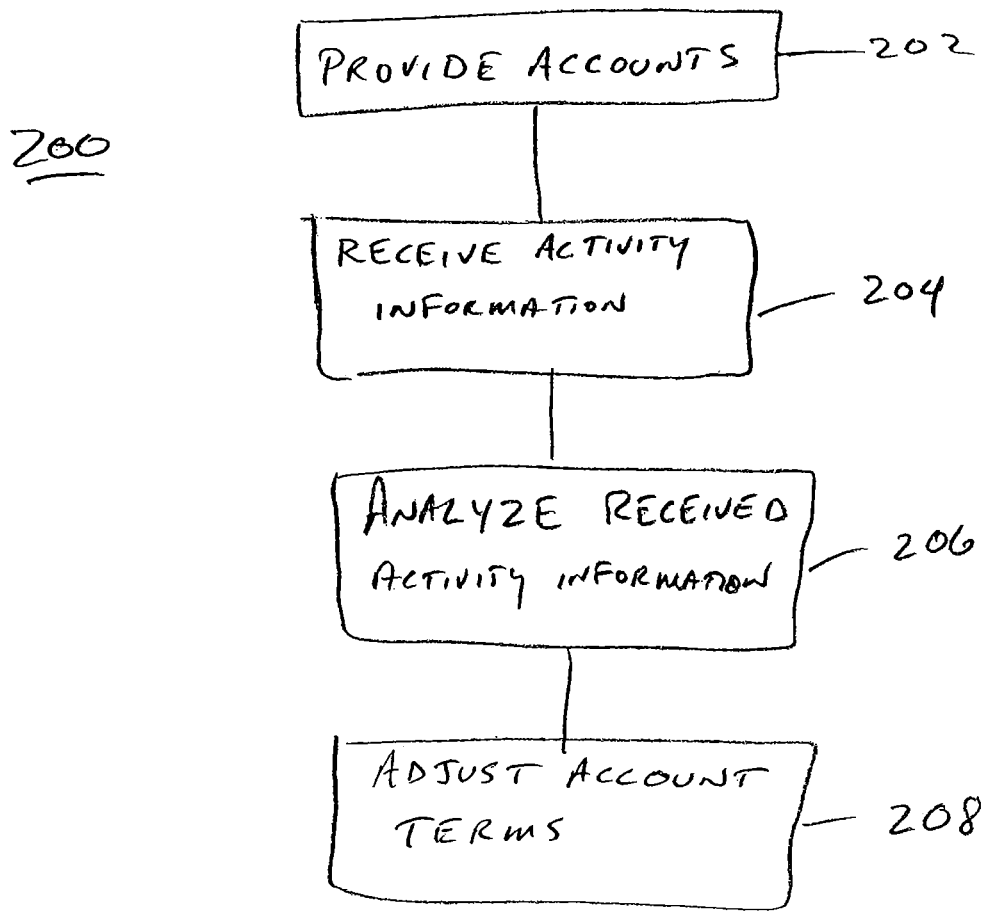
FIG. 2 is a flow diagram illustrating an exemplary method for managing related accounts according to the exemplary embodiments of the present application.

FIG. 2 illustrates an exemplary flow diagram for managing a plurality of accounts according to the present application. As shown in FIG. 2, the plurality of accounts are provided at step 202. The accounts may be provided at a physical location of institution 102, for instance at a branch office or retail outlet. Alternatively, the plurality of accounts may be provided via an electronic or computerized interface such as an automated teller machine or an Internet web page of the institution 102. Each of the plurality of accounts may be provided simultaneously or independently, and may be associated or linked with existing accounts maintained by the institution 102.

Provision of the plurality of accounts may include collection of information regarding the customer, for example customer identification and background information. In an exemplary embodiment, the information of the customer may include a customer name, a customer address, a customer taxpayer identification number, customer preexisting account and associated financial institution information, customer preexisting reward account information, a credit limit of a preexisting transaction account of the customer, customer financial asset information, customer financial history information, customer employment information, and the like.

Activity information associated with actions regarding at least one of the plurality of accounts may be received at a first predetermined frequency at step 204. The actions regarding at least one of the plurality of accounts may include, for example, a transaction such as a deposit of cash into the account, an Automated Clearing House ("ACH") deposit of cash into the account, a direct deposit transaction depositing cash into the account, a withdrawal of cash from the account, a cash advance debited against a balance of the account, an increase or decrease in a quantity of a debt, and the like.

Actions regarding the accounts of the present application may also include a purchase transaction, a credit transaction, a sales transaction, a crediting or deducting of reward points, a debt transaction, a home equity line of credit action, a security access action, a brokerage transaction, a transportation access action, a medical transaction, an academic transaction, and the like.

In an exemplary embodiment, receipt of account activity information may include collecting and storing information regarding the actions taken with respect to each of the accounts by the institution 102. For example, information regarding each action may be collected, the information including a quantity and/or price associated with the action, a date and time of the action, a location of the action, and a type of action. Additional information that may be collected and stored includes a vendor name and type, a vendor location, a product identification, and the like. The received activity information may be stored in one or more local databases located in the storage unit 112 of the central computer system 104.

The received account activity information may be analyzed in step 206 as illustrated in the flow diagram of FIG. 2. In an exemplary embodiment, the received and stored activity information may be analyzed using the processing system 110 of the central computer system 104. Alternatively, the activity information may be stored in one or more remote databases or storage devices connected to the central computer system 104 via a communications network.

As will be appreciated by one skilled in the art, the information may be analyzed by utilizing software programs or routines which may be run on the processing system 110 of the central computer system 104. The information may be input to the software programs or routines, and may be processed in accordance with a plurality of instructions.

Analysis of the information may be performed to generate a wide variety of results, and the results may be collated and/or stored in a variety of formats. In an exemplary embodiment, for example, amounts of funds deposited to or withdrawn from an account may be analyzed to determine a flow or rate of change of the funds into and out of the account. Additionally, a variation of an amount of funds deposited and/or withdrawn from an average or median deposit and/or withdrawal amount may be determined by comparison of the respective values.

Additionally, in alternative exemplary embodiments, dates and times of actions may be analyzed to determine a frequency of actions, such as a frequency of deposit transactions and/or withdrawal transactions. The determined frequency of actions may be combined with other activity information such as an amount of funds to determine sequences and patterns of actions.

Locations of performance of the actions may be analyzed to determine a geographical location for each action, for example within a city, county, state, or nation. Locations of actions may be stored and compared with other received and/or stored location information to determine geographical patterns of actions performed regarding the related accounts. The location information may be in the form of, for instance, a distance from a geographical landmark, a distance from a center point of a geographical region, a location within a ZIP code, a coordinate in the form of degrees latitude and longitude, and the like.

Information regarding a type of action may also be received and analyzed, for example information indicating whether an action is a transaction such as a purchase, withdrawal, deposit, or credit transaction. Additional information regarding a type of action may be received and analyzed, for example, information relating to a vendor identifier and/or an identifier associated with an item purchased or sold.

Each of the pieces of activity information may be analyzed independently, or may be analyzed in conjunction with one or more of the other pieces of information. In an exemplary embodiment, for example, a location of performance of the action may be correlated with a date and/or time of performance of the action. Additionally, a quantity of a deposit or a withdrawal action may be analyzed in conjunction with a frequency of the deposit or withdrawal action.

At least one term of one or more of the plurality of accounts may be adjusted based upon a result of the analysis at a second predetermined frequency at step 208, shown in FIG. 2. In an exemplary embodiment, for example, account terms that may be adjusted include an interest rate and an annual percentage rate ("APR"), whereby the interest rate and/or APR associated with an account may be increased or decreased based upon a result of the analysis of the account activity information.

For example, in an exemplary embodiment, an interest rate or an APR associated with an account may be increased or decreased based upon a quantity and/or frequency of deposits or withdrawals of funds into a related account. Likewise, an interest rate or an APR associated with an account may be adjusted based upon a rate of change of a fund balance in a related account.

Information related to other activity and/or account information may be analyzed, and the results of the analysis may be used to modify terms of any of the related accounts. In an exemplary embodiment, for instance, results of analysis including a frequency of usage, a rate of change of frequency of usage, an average or median balance of funds on deposit, a balance of funds on deposit at a predetermined point in time, a duration of account inactivity, a variation of account activity with respect to a median and/or average account activity, a pattern of activity location, a pattern of activity type, and the like may be used to modify one or more terms of any of the related accounts.

The modification may relate to a term corresponding to an entire account or to a portion of an account, for example, to a portion of a balance of the related account. Additionally, one or more terms relating to a portion of an account may be modified based upon a balance or corresponding portion of a balance of a related account.

For instance, processing system 110 may determine that a deposit account of the related accounts contains a balance of 2,000 dollars, and that a related credit account contains a balance of 5,000 dollars. Accordingly, a term of the credit account may be modified with respect to a portion of the credit account balance based upon the deposit account balance. For example, an APR of the credit account may be modified such that a first APR is applicable to 2,000 dollars of the total balance, corresponding to the deposit account balance, while a second APR may be applicable to the remaining 3,000 dollars of the total balance of the credit account.

Any of the terms of any of the related accounts may be adjusted in accordance with results of the analysis by processing unit 110. Adjustment of the terms associated with the related accounts may include adding, removing, increasing, decreasing, and modifying rates and/or quantities of at least one term depending upon at least one result of the analysis. Examples of adjustable terms associated with any of the related account include a credit limit; a grace period for interest or principal payments; a minimum balance required to be maintained in the account; eligibility for incentive reward points; a rate of accumulation of incentive reward points; an exchange value of accumulated incentive reward points; a brokerage commission rate; a brokerage margin rate; a mortgage loan rate; an access privilege to a secured area; a privilege for use of transportation services; a medical privilege; an academic privilege; and fees assessed against the account, including annual fees, access fees, transaction fees, late fees, maintenance fees, commission fees, inactivity fees, and the like.

Analysis of the activity information may be performed with respect to any or all of the plurality of accounts, simultaneously or sequentially. Furthermore, adjustment of the terms of each account may be performed with respect to one or more than one of the related accounts. Results of analysis of received activity information of one of the plurality of accounts may be utilized to adjust terms of the analyzed account, or may be used to adjust terms of other accounts related to that account, or both.

Receipt and analysis of the activity information may be performed at any suitable frequency. A frequency of receipt of activity information may be equal to or different than a frequency of adjustment of account terms. Additionally, different frequencies of receipt and/or analysis of account activity information may be utilized for each of the plurality of accounts. Adjustment may be performed on one or more of the terms of each account, and one or more terms of one account may be adjusted while terms of other accounts may remain unadjusted. In an exemplary embodiment, for instance, activity information for one or more of the related accounts may be received and analyzed on a daily or weekly basis, and adjustment of terms may be performed at a frequency approximately equal to that of the receipt and analysis of the activity information.

The embodiments described above are illustrative examples of the present application and it should not be construed that the present application is limited to these particular embodiments. Various changes and modifications may be effected by one skilled in the art without departing from the spirit or scope of the application as defined in the appended claims.

It should be understood that the application is not limited to the precise exemplary embodiments described herein and that various changes and modifications may be effected by one skilled in the art without departing from the spirit or scope of the application. For example, elements and/or features of different illustrative embodiments may be combined with each other and/or substituted for each other within the scope of the present disclosure and the appended claims. In addition, improvements and modifications which become apparent to persons of ordinary skill in the art after reading the present disclosure, the drawings, and the appended claims are deemed within the spirit and scope of the present application.

What is claimed is:

1. A method for managing a plurality of existing accounts, comprising:

providing, on at least one processor, a plurality of related accounts each associated with a same customer, the plurality of related accounts including a first existing account and a second existing account that are both associated with the same customer;

receiving, at the institution system via a network, account activity information associated with at least one action regarding the first account of the customer at a first predetermined frequency;

analyzing, on the at least one processor, the received account activity information and the first predetermined frequency; and modifying a least one term of the second account of the customer based upon a result of the analysis at a second predetermined frequency, wherein the second predetermined frequency is based on the analysis of the received account activity information and the first predetermined frequency, wherein the at least one term includes one of annual fees, access fees, transaction fees, late fees, maintenance fees, commission fees, or inactivity fees associated with the second account.

2. The method of claim 1, wherein each account of the plurality of accounts is one of a credit account, a savings account, a checking account, an incentive reward account, a mortgage account, a brokerage account, a stored value account, a security access account, a medical account, a transportation account, an academic account, or a home equity line of credit account.

3. The method of claim 1, wherein the account activity information includes at least one of a change in a balance, a change in a quantity of a debt, a quantity of a cash advance transaction, a location of the action, a date of the action, a time of the action, or a type of the action.

4. The method of claim 3, wherein the analyzing includes analyzing a rate of change of the balance.

5. The method of claim 4, wherein the analyzing includes analyzing a deviation of the rate of change of the balance from one of an average rate of change of the balance or a median rate of change of the balance.

6. The method of claim 3, wherein the analyzing includes analyzing a deviation in a quantity of the balance with respect to one of an average balance or a median balance.

7. The method of claim 3, wherein the analyzing includes analyzing a frequency of actions.

8. The method of claim 7, wherein the analyzing includes analyzing a deviation of the frequency of actions from one of an average frequency of actions or a median frequency of actions.

9. The method of claim 3, wherein the analyzing includes analyzing a geographical distribution of actions.

10. The method of claim 9, wherein the analyzing includes analyzing a deviation of the geographical distribution of actions from one of an average geographical distribution of actions or a median geographical distribution of actions.

11. The method of claim 3, wherein the analyzing includes analyzing a type of action.

12. The method of claim 3, wherein the analyzing includes analyzing a duration of time between at least two actions.

13. The method of claim 1, wherein the modifying includes one of adding to, removing from, increasing, decreasing, or otherwise modifying the at least one term associated with the second account.

14. The method of claim 13, wherein the at least one term relates to a portion of a balance of the second account.

15. The method of claim 13, wherein the at least one term includes an interest rate associated with the second account.

16. The method of claim 13, wherein the at least one term includes an annual percentage rate associated with the second account.

17. The method of claim 13, wherein the at least one term includes a credit limit associated with the second account.

18. The method of claim 13, wherein the at least one term includes a grace period for one of interest payments or principal payments associated with the second account.

19. The method of claim 13, wherein the at least one term includes a required minimum balance associated with the second account.

20. The method of claim 13, wherein the at least one term includes one of an eligibility for incentive reward points, a rate of accumulation of incentive reward points, or an exchange value of accumulated incentive reward points associated with the second account.

21. The method of claim 13, wherein the at least one term includes one of a brokerage commission rate or a brokerage margin rate associated with the second account.

22. The method of claim 13, wherein the at least one term includes a mortgage loan interest rate associated with the second account.

23. The method of claim 13, wherein the at least one term includes a home equity line of credit interest rate associated with the second account.

24. The method of claim 13, wherein the at least one term includes an access privilege to a secured area associated with the second account.

25. The method of claim 13, wherein the at least one term includes a privilege for use of transportation services associated with the second account.

26. The method of claim 13, wherein the at least one term includes a medical privilege associated with the second account.

27. The method of claim 13, wherein the at least one term includes an academic privilege associated with the second account.

* * * * *